ated Sept. 14, 1971

United States Patent

[11] 3,604,746

| [72] | Inventor | Gennaro Vincent Notari<br>Simsbury, Conn. |
|---|---|---|
| [21] | Appl. No. | 777,401 |
| [22] | Filed | Nov. 20, 1968 |
| [45] | Patented | Sept. 14, 1971 |
| [73] | Assignee | Combustion Engineering, Inc.<br>Windsor, Conn.<br>Continuation-in-part of application Ser. No.<br>674,205, Oct. 10, 1967, now abandoned. |

[54] NUCLEAR REACTOR CONTROL ELEMENT GRIPPER AND DRIVE APPARATUS
10 Claims, 9 Drawing Figs.

[52] U.S. Cl. ................................................ 294/90,
176/36, 176/86, 294/86.37, 294/99
[51] Int. Cl. ..................................................... G21c 19/10
[50] Field of Search .......................................... 176/36, 86;
294/86, 86.1, 86.02, 90, 99, 86.32

[56] References Cited
UNITED STATES PATENTS

| 3,107,209 | 10/1963 | Frisch | 176/86 |
| 3,139,384 | 6/1964 | Filloleau et al. | 176/36 |

*Primary Examiner*—Carl D. Quarforth
*Assistant Examiner*—Harvey E. Behrend
*Attorneys*—Carlton F. Bryant, Eldon H. Luther, Robert L. Olson, John E. Carney, Richard H. Berneike, Edward L. Kochey, Jr. and Lawrence P. Kessler

ABSTRACT: An apparatus for gripping, driving, and disconnecting control elements in a nuclear reactor having grippers mounted on an elongated support tube and gripper operators mounted on an elongated rod extending through the support tube and movable longitudinally therein to operate the grippers. The support tube is suspended from its upper end on a control element drive means by a nut and nut-locking mechanism. Unlocking and rotating the nut raises and lowers the support tube and grippers between an operating position and a disconnecting position and raising and lowering the rod within the tube operates the grippers. A plurality of control elements may be connected to a single drive assembly.

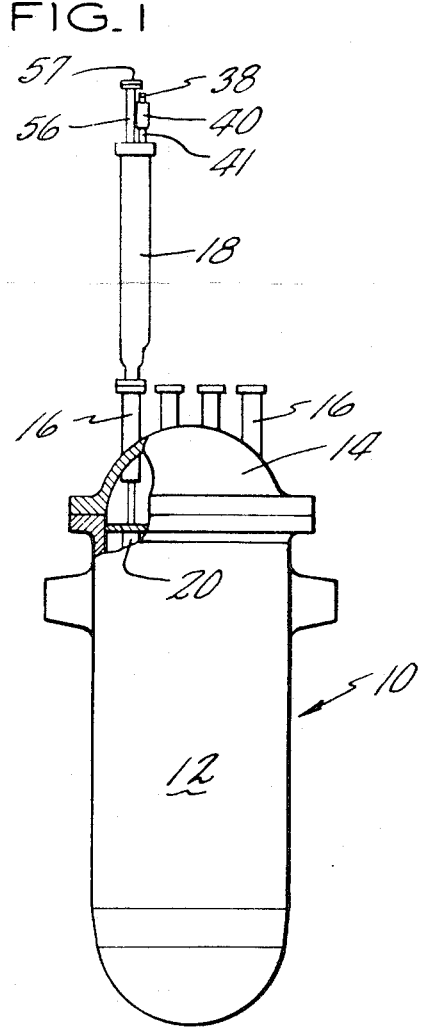
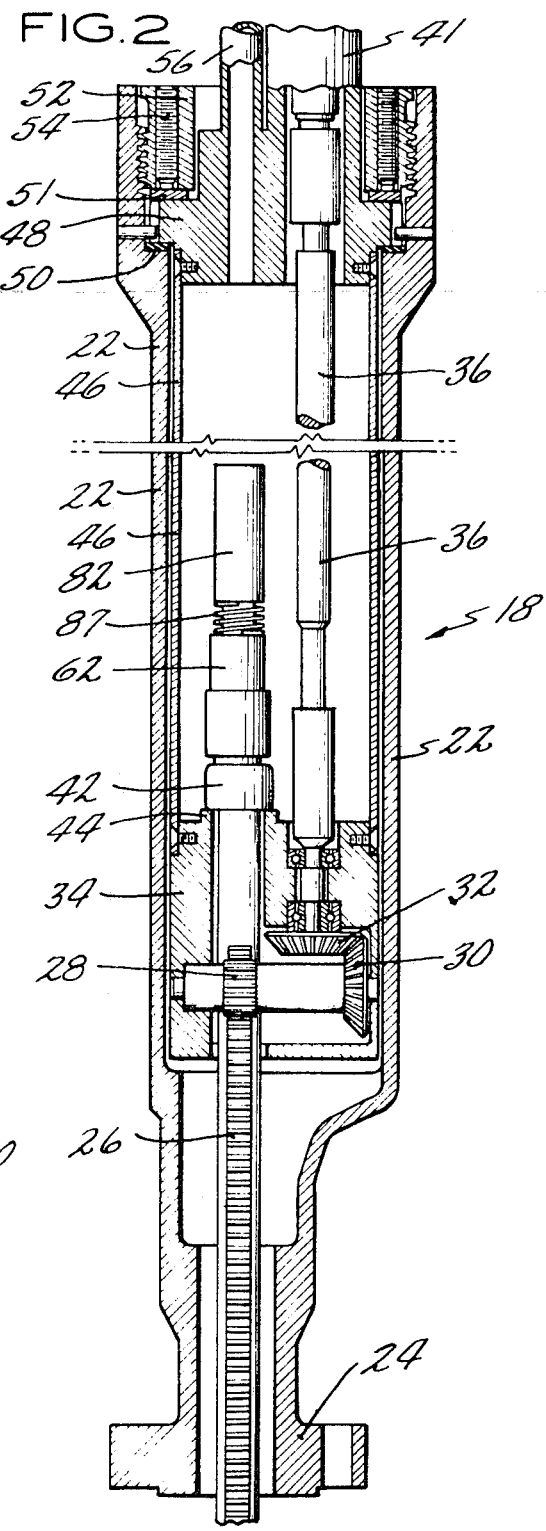
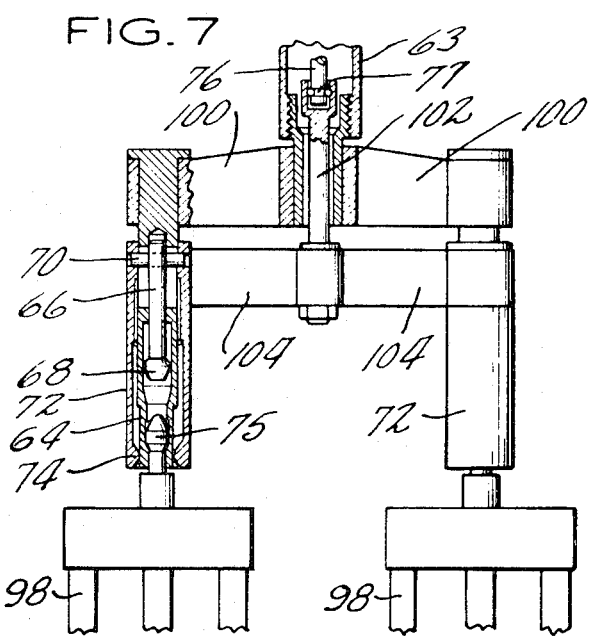
INVENTOR
GENNARO V. NOTARI

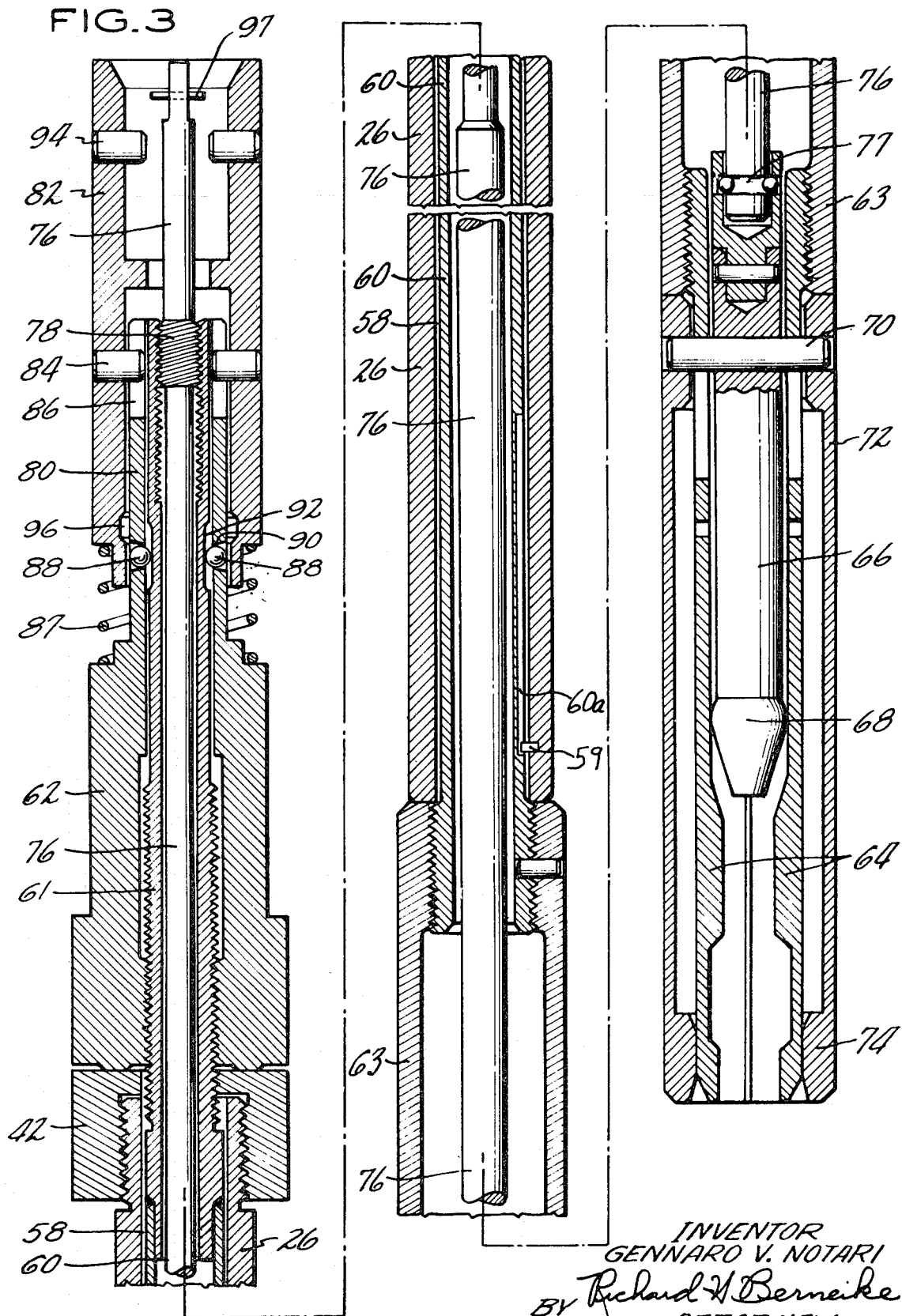

INVENTOR
GENNARO V. NOTARI

INVENTOR
GENNARO V. NOTARI

NUCLEAR REACTOR CONTROL ELEMENT GRIPPER AND DRIVE APPARATUS

This application is a continuation-in-part of U.S. Pat. application Ser. No. 674,205 filed Oct. 10, 1967, now abandoned.

BACKGROUND OF THE INVENTION

In the operation and maintenance of nuclear reactors, it is necessary to remove the fuel assemblies at predetermined intervals and to refuel the reactor. This requires that the head of the reactor vessel be removed together with the control element drive means which are mounted thereon. After the head has been removed, the control element shrouds and core hold-down means are removed to expose the fuel element assemblies for removal. Conventional reactors must be shut down during the refueling operation and the control elements must remain fully inserted in the core when the head and control element drives are removed. It is therefore necessary to provide means for disconnecting the control elements from the control element drives to accommodate such removal.

Since rather high pressures exist in reactor vessels during operation and since at least portions of the control element drive mechanisms are subjected to such pressures, the drives must be designed to contain the pressure. This tends to complicate the problems of easy access to and operation of the coupling mechanisms.

SUMMARY OF THE INVENTION

The present invention is therefore directed to control element drive assemblies incorporating readily accessible and operable means for gripping and releasing the control elements from the drive assemblies. This is accomplished in the present invention by providing means for suspending the grippers from the reciprocating drive portion of the apparatus and means for raising and lowering the grippers to and from operating and disconnecting positions. Means are also provided for operating the grippers when they are in the disconnecting position. Both the raising and lowering means and the gripper operating means are readily accessible through an access opening in the drive assembly.

BRIEF DESCRIPTION OF THE DRAWINGS

FIG. 1 is an elevation view partially broken away illustrating a nuclear reactor incorporating the present invention;

FIG. 2 is a vertical section view in cross section illustrating a portion of a control element drive assembly;

FIG. 3 is a vertical cross section view broken into three parts illustrating the details of a gripper and the means for attaching the gripper to a rack;

FIG. 7 illustrates a modification of the invention for actuating a plurality of control elements from a single drive.

DESCRIPTION OF THE PREFERRED EMBODIMENT

Figure 4:
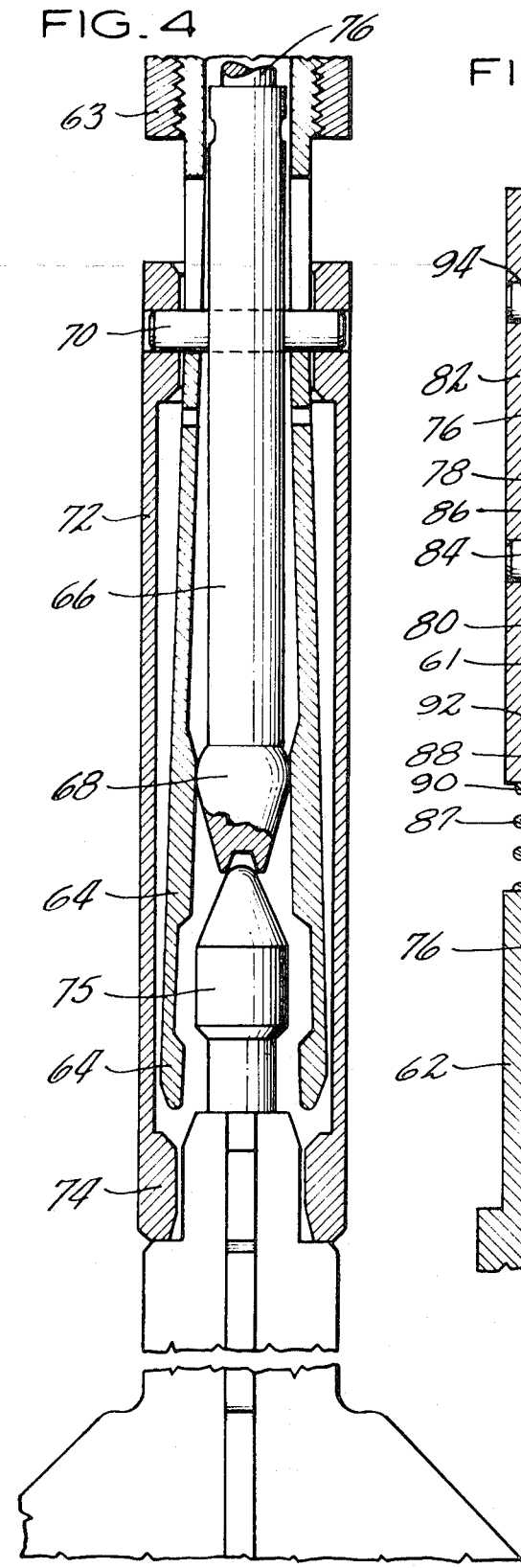
FIG. 4 is a vertical cross section view illustrating a gripper in the open position.

Referring first to FIG. 1, there is illustrated a nuclear reactor 10 which includes a reactor vessel 12 and a vessel head 14. Extending through the vessel head 14 are a plurality of nozzles 16 on which are mounted the control element drive assemblies 18, only one of which is shown. The control elements (not shown in FIG. 1) are contained within the shrouds 20 and are vertically movable in and out of the reactor core.

Referring now to FIG. 2, there is illustrated in more detail a portion of a drive assembly 18. This assembly comprises a pressure housing 22 which is adapted to be mounted on top of nozzle 16 by means of the flange 24 and suitably sealed thereto. The control elements are reciprocated by means of a rack and pinion drive. The rack 26 is mounted for vertical movement within the housing 22 and is driven by means of the pinion gear 28 and the bevel gears 30 and 32, all of which are mounted in the gear housing 34. Attached to the bevel gear 32 is a drive shaft 36 which is attached to the drive motor 38 (shown in FIG. 1) through conventional clutch and braking means in the section 40 (also shown in FIG. 1). Pressure sealing means are provided around drive shaft 36 in section 41. Upon rotation of the drive motor 38, the shaft 36, bevel gears 30 and 32, and pinion gear 28 are rotated thus causing the rack 26 to be either raised or lowered depending on the direction of rotation. The control elements which are attached to the rack by means described hereinafter are therefore raised and lowered within the reactor core. The enlarged portion 42 at the upper end of the rack 26 limits the downward movement of the rack by engaging the hard stop 44. This hard stop 44 as well as the gear housing 34 is suspended by means of the cylindrical support 46.

Closing off and sealing the upper end of the housing 22 is a closure plug 48. The plug 48 is sealed to the top of the housing 22 by means of the gasket 50. On top of the plug 48 is is a washer 51 and a housing ring 52 which is threaded into the pressure housing 22. The screws 54 in the housing ring are screwed down against the washer 51 to force the plug 48 into sealing engagement with the gasket 50. The cylindrical support 46 is attached to and supported by plug 48. Extending upwardly from and forming a part of the plug 48 is a control element uncoupling access tube 56 through which uncoupling tools are inserted as will be described hereinafter. The upper end of the access tube is sealed by cover plate 57 (see FIG. 1). The drive shaft 36 extends through this plug 48 and is sealed thereto by the previously mentioned seal in section 41.

Referring now to FIG. 3, which is broken into three sections, there is illustrated in cross section the details of the rack and the grippers and the means by which the grippers are operated. Extending throughout the length of the rack 26 is a hole 58 through which is inserted a tube 60. This tube, which may be formed from a plurality of interconnected sections, has a section 61 at its upper end which is threaded into an elongated nutlike member 62. The tube 60 is thus suspended by means of the nut 62 from the upper surface of the enlarged portion 42 of the rack. The tube 60 contains a longitudinally extending slot 60a at its lower end. A pin 59 can move vertically in the slot 60a to permit longitudinal movement of the tube with respect to the rack. Attached to the lower end of the tube 60 by means of the section 63 of the tube 60 is a gripper assembly.

Each of the gripper assemblies comprises a plurality of fingers 64 which are adapted to move radially inward to a gripping position is illustrated in FIG. 3 and outward to a disconnecting position as shown in FIG. 4. Reciprocally mounted relative to the fingers 64 is a gripper-operating mechanism to force the fingers into and out of the open and closed positions. The gripper-operating mechanism comprises a rod 66 located inside the fingers 64 with an enlarged portion 68 which forms a camming surface to force the fingers 64 apart as shown in FIG. 4. Attached to the rod 66 by means of a pin 70 is a cylindrical member 72 at the lower end of which are camming members 74. The entire gripper-operating mechanism reciprocates vertically relative to the fingers 64 into the positions shown in FIGS. 3 and 4. In the closed position of of FIG. 3, the camming members 74 hold the fingers in the closed position; and in the position shown in FIG. 4, the camming members 74 have released the fingers 64 and the enlarged portion 68 of the rod 66 had forced the fingers apart to release the lifting attachment 75 on the control element.

The entire gripper-operating mechanism is attached by means of rotatable joint 77 to a rod 76 which extends vertically through the tube 60 and the rack 26. The rod 76 has a threaded portion 78 at the upper end which is threaded into the tube 60 whereby rotation of the rod 76 will cause it to be moved vertically within the tube 60 whereby rotation of the rod 76 will cause it to be moved vertically within the tube 60.

Since rod 76 is to be rotated, it is connected to the gripper-operating mechanisms by means of the previously mentioned rotatable joint 77.

Figure 5:
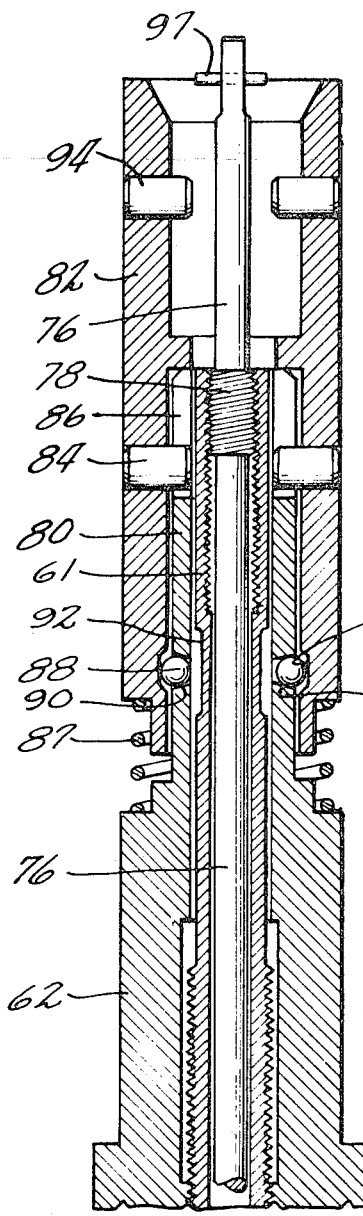
FIGS. 5 and 6 are vertical section views illustrating the operations involved in actuating the grippers.
Figure 6:
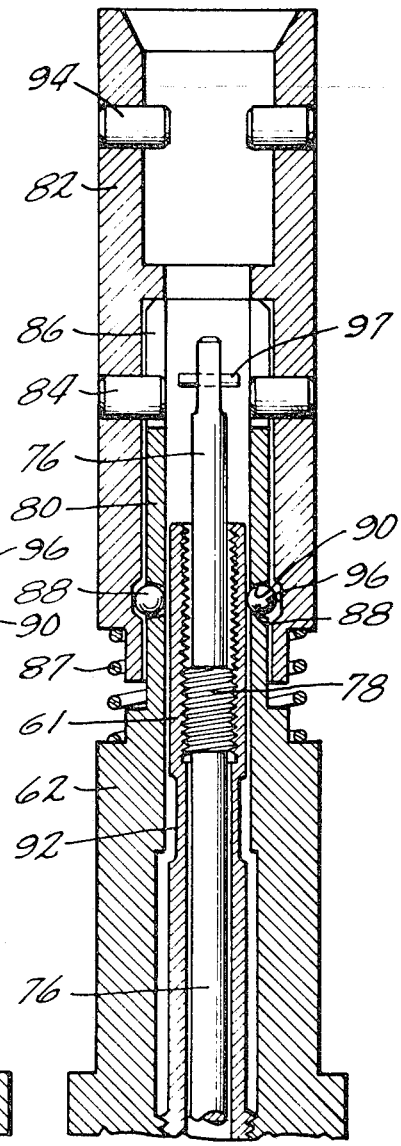

Since vibration or operation of the control rod drive mechanism could cause the nut 62 to rotate relative to tube 60 during reactor operation or at other undesirable times, means are provided as shown in detail in FIGS. 3, 5 and 6 for locking the nut to the tube and for unlocking the same when desired. Extending upwardly from the upper part of the nut 62 is a sleeve 80 which fits around the section 61 of the tube 60. Mounted around the sleeve 80 is a lock operator 82 with pins 84 extending inwardly therefrom into slots 86 in the sleeve 80. The pins 84 prevent the lock operator 82 from rotating relative to the sleeve 80 and the nut 62 but permit the operator 82 to be moved axially. Spring 87 between the nut 62 and operator 82 forces the operator upwardly away from the nut as shown in FIG. 3. In this position a ball detent mechanism locks the sleeve 80 and thus the nut 62 to the section 61 of the tube 60. The ball detent comprises the balls 88 in the apertures 90 in the sleeve 80. In the locked position, the balls are forced by the operator 82 partially into the depressions 92 in the section 61 of the tube 60 as shown in in FIG. 3 thus preventing relative rotation between the sleeve 80 and the tube 60.

In order to unlock and rotate the nut 62, the cover plate 57 (FIG. 1) is removed from the access tube 56 and a tool is inserted which will engage the pins 94 on the lock operator 82. The tool is first employed to depress the lock operator against the force of the spring 87 to the position shown in FIG. 5. In this depressed position, the depressions 96 in the lock operator 82 lie adjacent the balls 88 and the balls fall into these latter depressions and out of the depressions 92. The tool is then rotated so as to cause rotation of the lock operator 82. The pins 84 cause the nut 62 to rotate, thereby lowering tube 60 within the rack 26 to the position shown in FIG. 6.

The entire operation of the the control element drive assembly will now be described. When it is desired to uncouple the control element assemblies such as during a refueling operation, the racks 26 are lowered as for as possible. In this position the control element assemblies are not quite resting on any internal reactor structure. The cover 57 on the control element uncoupling access tube 56 is removed and the first tool inserted to operate the nut-locking mechanism as previously described. After the nut-locking mechanism has been depressed to unlock the nut 62 from the tube 60, the tool is rotated so as to rotate the nut 62 from the tube 60, the tool is rotated so as to rotate the nut 62 and to lower the tube 60, the tool is rotated so as to rotate the nut 62 and to lower the tube 60 within the rack 26 as indicated in FIG. 6. This operation lowers the control element assemblies such that they are resting on the reactor internals. Further rotation would cause the nut 62 to move up on tube 60 and this can be detected by the operator since the tool will also begin to move up. The operator can therefore tell when the nut has been unscrewed sufficiently.

At this point the first tool is removed from the access tube 56 and a second tool is inserted to operate the grippers. This tool fits over the pins 97 at the upper end of the rod 76 and rotates the rod so as to screw the rod down within the tube 60 to the position shown in FIG. 6. This causes the gripper-operating mechanism to be lowered with respect to the fingers 64 whereby the fingers are opened and the control element assembly released.

After the control element has been released by the gripper, the rack 26 is driven to the upper limit of travel and a mechanical detent (not shown) is engaged which prevents the rack from dropping when the clutching mechanism is deenergized. At this point the electrical connection to the control element drive assembly may be disconnected. After this procedure has been followed for each of the control element drive assemblies, the vessel head 14 may be removed from the reactor vessel 12 together with the drive assemblies 18 mounted thereon. The control elements shrouds and the core holddown plate and related components may then be removed from the reactor vessel to expose the core.

After refueling or carrying out such operations as are desired and after replacing the core holddown plate and shrouds and control assemblies, the vessel head 14 may be replaced. This is accomplished by first screwing the nut 62 back down on tube 60 to raise the tube 60 as well as the rod 76 and the grippers with respect to the rack 26. The vessel head is then replaced and the control element drive assemblies connected to the electrical supply. The racks 26 are then released and lowered as far as possible. The first tool is then removed and the second tool inserted to rotate rod 76 and move it upwardly within tube 60. This closes the gripper on the lifting attachment 75. The second tool is then removed and the first tool is inserted to rotate nut 62 to again raise the tube 60 and the gripper with respect to the rack such that the control element assembly is no longer resting sn the reactor internals. This completes the recoupling operation and the drive assemblies are ready for reactor operation.

The present invention is particularly adaptable to connecting a plurality of control element assemblies to a single drive assembly. The number which can be connected to a single drive is only limited by the weight involved and the complexity of the shrouding. FIG. 7 illustrates an embodiment of the invention wherein two control element assemblies 98 are connected to a single drive mechanism. These control element assemblies 98 are of the finger type as described and claimed in U.S. Pat. application SER. No. 632,509 filed Apr. 14, 1967, by Royce J. Rickert. In this embodiment, the section 63 of the tube 60 is connected to the radially extending arms 100 which extend to positions over the lifting attachments 75 on the control element assemblies. The fingers 64 of the grippers are attached to and extend downwardly from the radial arms 100. The rod 76 in this embodiment is attached through the rotating joint 77 to a rod 102 which is attached to the radially extending arms 104. These arms 104 are in turn attached to the cylindrical members 72 and, through the pins 70, to the rods 66. When the rod 76 is screwed down within the tube 60, the radial arms 104. These arms 104 will be lowered with respect to the radial arms 100 causing the grippers to be opened.

Figure 8:
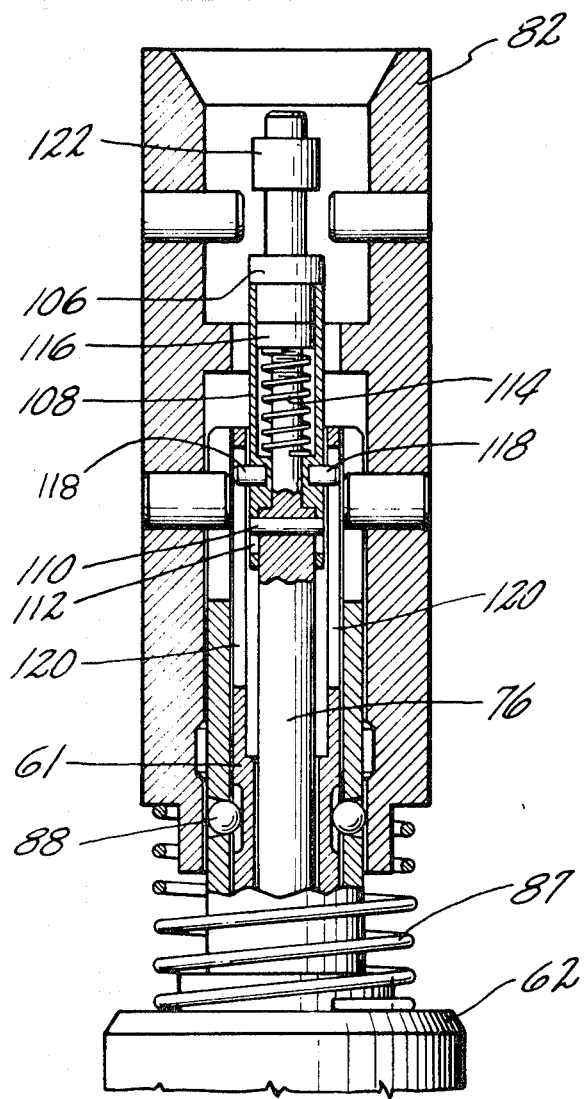
FIGS. 8 and 9 illustrate an alternative arrangement for actuating the grippers.
Figure 9:
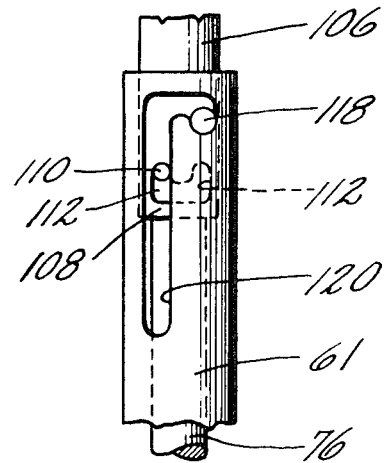

FIGS. 8 and 9 illustrate an alternative arrangement for raising and lowering the rod 76 within the tube 60. Instead of screwing rod 76 up and down within the tube, a J-slot arrangement is provided. Mounted on the upper end of the rod 76 is an operating attachment 106 which includes a sleeve portion 108. The spring 114 engages the nut 116 on the top of the rod 76 and forces the operating attachment 106 downwardly such that the pin 110 normally is engaged in one leg of the U-slots 112 as shown in FIG. 9. Extending outwardly from the sleeve portion 108 of the operating attachment 106 are pins 118 which are engaged in the J-slots 120 located in the section 61 of the tube 60. The grippers are in the closed position when the elements are in the relationship depicted in FIGS. 8 and 9. To release the grippers, the second tool is fitted over the lug 122 on the upper end of the operating attachment 106 such that the operating attachment may first be lifted against the force of the spring 114. This raises the pins 118 out of the J-slot depressions and raises the U-slots 112 in the sleeve portion 108 upwardly relative to the pin 110. The tool is then rotated so as to rotate the operating attachment 106 whereby the pins 118 may be lowered in the long leg of the J-slots to lower the rod 76. The pin 110 will then be located in the other leg of the U-slots 112 from that depicted in FIG. 9. To raise the rod 76 to reclose the grippers, the second tool is again fitted over the lug 122 and lifted to raise the operating attachment 106 and the rod 76. The lifting force will be transferred from the operating attachment to the rod trough the pin 110 and the U-slots 112 rather than having the entire lifting force transferred through the spring 114 thus preventing an overload on the spring. When the components have been lifted they are again rotated back to the position as depicted in FIG. 9 to lock the grippers in the closed position.

While preferred embodiments of the invention have been shown and described, it is to be understood that such showings are merely illustrative and that changes may be made without departing from the spirit and scope of the invention as claimed.

I claim:

1. A control element drive and coupling apparatus comprising:
   a. a control element gripper, said gripper including:
      1. a plurality of clamping jaws located about a longitudinal axis thereof, said clamping jaws adapted to move radially inwardly toward said axis to a clamped position and radially outwardly to an unclamped position;
      2. gripper-operating means movable longitudinally with respect to said clamping jaws to a raised and lowered position to force said clamping jaws into and out of said clamped and unclamped positions;
   b. a tube extending longitudinally upwardly from and connected to said clamping jaws;
   c. a rod extending axially through said tube and connected to said gripper-operating means whereby longitudinal movement of said rod with respect to said tube moves said gripper-operating means with respect to said clamping jaws to operate said gripper;
   d. means for holding said rod within said tube and for permitting said longitudinal movement of said rod with respect to said tube to raised and lowered positions corresponding to said raised and lowered positions corresponding to said raised and lowered positions of said gripper-operating means;
   e. a rack and pinion control element drive mechanism;
   a hole extending longitudinally through said rack, said tube with said rod therein extending through said hold in said rack;
   g. supporting means attached to the upper end of said tube remote from said gripper, said supporting means adapted to suspend said tube and rod and gripper from the upper end of said rack remote from said gripper whereby longitudinal movement of said rack will cause longitudinal movement of said supporting means and the components suspended therefrom;
   h. said supporting means being longitudinally movable with respect to said tube whereby said tube may be longitudinally moved with respect to said rack to positions for clamping and unclamping.

2. A control element drive and coupling apparatus as recited in claim 1 wherein said means for holding said rod within said tube comprises engaging screw threads on said rod and inside said tube whereby rotation of said rod with respect to said tube causes said rod to move longitudinally within said tube.

3. A control element drive and coupling apparatus as recited in claim 1 wherein said means for holding said rod within said tube comprises;
   a. a J-slot in said tube, the hooked end of said J-slot being oriented upwardly and away from said gripper;
   b. a pin extending outwardly into said J-slot; and
   c. means attaching said pin to said rod whereby said rod and pin may be moved longitudinally with respect to said tube so as to open and close said gripper and whereby said pin may be rotated into said hooked end of said J-slot to lock said rod in said raised position.

4. A control element drive and coupling apparatus as recited in claim 3 wherein said means attaching said pin to said rod comprises;
   a sleeve extending over the end of said rod, said pin being attached to and extending outwardly from said sleeve into said J-slot;
   b. a U-slot in said sleeve, the ends of said U-slot extending upwardly;
   c. a second pin attached to said rod and extending outwardly therefrom into said U-slot;
   d. a spring biasing said sleeve downwardly onto said rod end such that said second pin normally rests in one leg of said U-slot;
   e. means for lifting said sleeve against the force of said spring to lift said first pin out of said hooked end of said J-slot and to lift said U-slot with respect to said second pin and means to rotate said sleeve with respect to said rod and tube to a position such that said second pin is in line with the opposite leg of said U-slot and said first pin may be lowered in said J-slot to lower said sleeve and said rod with respect to said tube to unclamp said gripper.

5. A control element drive and coupling apparatus as recited in claim 1 wherein said supporting means attached to the upper end of said tube comprises a nut screwed onto said tube and resting on the upper end of said rack whereby rotation of said nut moves said nut longitudinally with respect to said tube thereby allowing said tube to be raised and lowered within said rack.

6. A control element drive and coupling apparatus as recited in claim 5 and further including means for locking and unlocking and rotating said nut including:
   a. a slidable sleeve extending over a portion of said nut;
   b. a spring biasing said slidable sleeve upwardly on said nut;
   c. at least one aperture extending radially through said nut adjacent said slidable sleeve;
   d. a lock ball located in said aperture;
   e. a detent in said tube adjacent said aperture when said nut is in the normal operating position with respect to said tube, said slidable sleeve adapted to force said lock ball partially from said aperture into said detent in said tube to lock said nut into said tube;
   f. said slidable sleeve having a recess therein located so as to be adjacent said aperture and lock ball upon being depressed against said spring whereby said lock ball may be displaced into said recess and out of said detent and said nut may be rotated on said tube.

7. A control element drive and coupling apparatus comprising:
   a. a control element gripper, said gripper including:
      1. a plurality of clamping jaws movable into and out of clamping position;
      2. a gripper-operating means adapted to be operated to move said clamping jaws into and out of said clamping position;
   b. a tube extending longitudinally upwardly from and connected to and suspending said clamping jaws;
   c. a rod connected to said gripper-operating means and extending longitudinally upwardly through said tube, said rod adapted to operate said gripper-operating means upon longitudinal movement of said rod with respect to said tube;
   d. means for holding said rod within said tube and for permitting said longitudinal movement of said rod with respect to said tube to raised and lowered positions corresponding to the clamped and unclamped positions of said gripper;
   e. vertically movable drive means having an opening therein, said tube extending upwardly through said opening; and
   f. means attached to said tube above said opening adapted to suspend said tube from said drive means, said means attached to said tube adapted to be moved longitudinally with respect to said tube to lower and raise said tube and said control element to and from a gripper-operating position.

8. A drive and latching mechanism adapted to be attached to and drive a predetermined plural number of nuclear reactor control assemblies comprising:
   a. a rack and pinion drive mechanism, said rack extending vertically and having a hole extending vertically therethrough;
   b. tubular means extending through said hole in said rack from a position above said rack to a position below said rack;
   c. a plurality of first radial arms equal to said predetermined number attached to said tube below said rack and extending outwardly therefrom;
   d. rod means extending vertically through said tubular means to a position below said tubular means and said first radial arms;

e. means for holding said rod means within said tubular means and for permitting vertical movement of said rod means with respect to said tubular means between a raised and a lowered position;

f. a plurality of second radial arms equal in number to said predetermined number attached to said rod means below said tubular means and extending outwardly therefrom and movable vertically with said rod;

g. a plurality of grippers adapted to grip said control assemblies, each of said grippers including:
   1. a plurality of clamping jaws located about a vertical axis of said gripper, said clamping jaws attached to and extending downwardly from said first radial arms and adapted to move radial arms and adapted to move radially inwardly toward said axis to a clamped position and radially outwardly to an unclamped position;
   2. gripper-operating means movable vertically with respect to said clamping jaws to a raised and lowered position to force said clamping jaws into and out of said clamped and unclamped positions, said gripper-operating means attached to and extending downwardly from said second radial arms;

h. a nut screwed onto said tubular means above said rack, said nut adapted to be supported on the upper end of said rack whereby said nut suspends said tubular means from the top of said rack;

i. means for rotating said nut to lower said tubular means with respect to said rack to a clamping and unclamping position and to raise said tubular means within said rack to an operating position.

9. A drive and latching mechanism as recited in claim 8 wherein said means for holding said rod means within said tubular means comprises engaging screw threads on said rod means and inside said tubular means whereby rotation of said rod means with respect to said tubular means causes said rod means to move vertically within said tubular means.

10. A drive and latching mechanism as recited in claim 8 wherein said means for holding said rod means within said tubular means comprises:

a. a J-slot in said tubular means, the hooked end of said J-slot being oriented upwardly and away from said grippers:

b. a pin extending outwardly into said J-slot; and c. means attaching said pin to said rod means whereby said rod means and pin may be moved vertically with respect to said tubular means so as to open and close said grippers and whereby said pin may be rotated into said hooked end of said J-slot to lock said rod means in said raised position.

PO-1050
(5/69)

UNITED STATES PATENT OFFICE
CERTIFICATE OF CORRECTION

Patent No. 3,604,746            Dated September 14, 1971

Inventor(s) Gennaro Vincent Notari

It is certified that error appears in the above-identified patent and that said Letters Patent are hereby corrected as shown below:

Column 2, Line 36 — After "by which the grippers are" insert "connected to the rack and the means by which the grippers are"

Column 2, Line 44 — After "end." insert sentence "A pin 59 fixed to the rack 26 extends into the slot 60a to prevent rotation of the tube 60 with respect to the rack 26 during rotation of the nut 62."

Column 2, Line 74 — After "60" cancel "whereby rotation of the rod 76 will cause it to be moved vertically within the tube 60."

Column 3, Line 44 — After "described." cancel the sentence "After the nut-locking mechanism has been depressed to unlock the nut 62 from the tube 60, the tool is rotated so as to rotate the nut 62 from the tube 60, the tool is rotated so as to rotate the nut 62 and to lower the tube 60, the tool is rotated so as to rotate the nut 62 and to lower the tube 60 within the rack 26 as indicated in FIG. 6."

Column 3, Line 44 — After "described." insert sentence "After the nut locking mechanism has been depressed to unlock the nut 62 from the tube 60, the tool is rotated so as to rotate the nut 62 and to lower the tube 60 within the rack 26 as indicated in FIG. 6."

Column 4, Line 9 — After "possible." insert sentence "The first tool is then inserted through the access tube 56 and the nut 62 again unscrewed to lower the gripper over the lifting attachment 75."

Column 4, Line 37 — After "radial arms 104" cancel "These arms 104"

Column 4, Line 44 — After "108" insert "extending down over the upper end of rod 76."

Column 4, Line 44 — Before "The spring 114" insert sentence "A pin 110 extends outwardly from the rod 76 into U-slots 112 on each side of the sleeve portion 108."

Column 5, Line 23 — After "lowered portions" cancel "corresponding to said raised and lowered positions"

UNITED STATES PATENT OFFICE
CERTIFICATE OF CORRECTION

Patent No. 3,604,746        Dated September 14, 1971

Inventor(s) Gennaro Vincent Notari        PAGE - 2

It is certified that error appears in the above-identified patent and that said Letters Patent are hereby corrected as shown below:

Column 5, Line 27 - Before "a hole" insert "f."
Column 5, Line 28 - After "through said" omit "hold"
Column 5, Line 28 - After "through said" insert "hole"
Column 7, Line 14 - After "adapted to move" omit "radial arms and adapted to move"

Signed and sealed this 19th day of September 1972.

(SEAL)
Attest:

EDWARD M. FLETCHER, JR.
Attesting Officer

ROBERT GOTTSCHALK
Commissioner of Patents